(12) United States Patent
Ali et al.

(10) Patent No.: US 7,461,243 B2
(45) Date of Patent: Dec. 2, 2008

(54) DEFERRED BRANCH HISTORY UPDATE SCHEME

(75) Inventors: Abid Ali, San Jose, CA (US); Jiejun Lu, Sunnyvale, CA (US); Brian F. Keish, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 111 days.

(21) Appl. No.: 11/316,722

(22) Filed: Dec. 22, 2005

(65) Prior Publication Data

US 2007/0150712 A1   Jun. 28, 2007

(51) Int. Cl.
G06F 7/38 (2006.01)
G06F 9/00 (2006.01)
G06F 9/44 (2006.01)
G06F 15/00 (2006.01)

(52) U.S. Cl. ........................... 712/239; 712/240
(58) Field of Classification Search ................. 712/239, 712/240
See application file for complete search history.

(56) References Cited

U.S. PATENT DOCUMENTS

| | | |
|---|---|---|
| 5,142,634 A | 8/1992 | Fite et al. |
| 5,878,255 A * | 3/1999 | Tran et al. ............ 712/240 |
| 6,189,091 B1 * | 2/2001 | Col et al. ............. 712/240 |
| 6,295,600 B1 * | 9/2001 | Parady ................ 712/228 |
| 6,526,502 B1 * | 2/2003 | Col et al. ............. 712/239 |
| 2001/0020267 A1 * | 9/2001 | Koino ................ 712/239 |
| 2002/0029333 A1 * | 3/2002 | Talcott ............... 712/239 |
| 2005/0027975 A1 * | 2/2005 | Frommer et al. ...... 712/240 |

* cited by examiner

*Primary Examiner*—Eddie P Chan
*Assistant Examiner*—George D Giroux
(74) *Attorney, Agent, or Firm*—Lawrence J Merkel; Meyertons, Hood, Kivlin, Kowert & Goetzel, P.C.

(57) ABSTRACT

In one embodiment, a processor comprises a branch prediction array, an index generator coupled to the branch prediction array, and a control unit coupled to the index generator. The branch prediction array is configured to store a plurality of branch predictions for conditional branches. The index generator is configured to generate an index to the branch prediction array responsive to at least a portion of a fetch address corresponding to a fetch request that is at a first pipeline stage of the processor and further responsive to a branch history. The control unit is configured to update the branch history responsive to a first fetch request at the first pipeline stage and to defer the update for a second fetch request to a second pipeline stage subsequent to the first pipeline stage.

20 Claims, 8 Drawing Sheets

DEFERRED BRANCH HISTORY UPDATE SCHEME

BACKGROUND

1. Field of the Invention

This invention is related to the field of processors and, more particularly, to branch prediction mechanisms in processors.

2. Description of the Related Art

A critical aspect of the performance of a processor is its ability to handle conditional branches. Conditional branches cause instruction fetching to shift from the sequential path to a target path if a condition specified by the branch is true, and do not cause the shift if the specified condition is false. Accordingly, when fetched instructions include a conditional branch, subsequent fetching is dependent on resolving the condition specified by the conditional branch. Simply stalling subsequent fetching is one option, but that option often leads to lower performance. Accordingly, many processors implement some form of branch prediction.

One popular form of branch prediction involves training branch predictions stored in a branch prediction array based on the past execution behavior of conditional branches. Indexing the branch prediction array to select a branch prediction is dependent on the fetch address that corresponds to a given conditional branch. Additionally, in some mechanisms, a branch history is maintained that is used in the index generation. Since the behavior of a given branch may depend on the route of instruction execution that arrived at the given branch, including the branch history in the index generation may cause different branch predictions to be used (and trained) for different branch histories.

Accordingly, maintaining a consistent branch history for each fetch request is an important part of ensuring branch prediction accuracy. In a pipelined processor, where the update of the branch history may be delayed one or more clock cycles from its use in index generation, the consistency of the branch history is difficult to maintain. For example, if one fetch request passes through the pipeline and another, subsequent fetch request is close behind, the branch history that exists for the subsequent fetch request may not yet have been updated to reflect the previous fetch request. On the other hand, if the subsequent fetch request is delayed with respect to the previous fetch request, the branch history for the subsequent fetch request will be updated to reflect the previous fetch request. Accordingly, inconsistent branch histories may be used for the same fetch request, depending on its timing with respect to previous fetch requests. Branch prediction accuracy may be negatively impacted, which may impact overall performance.

SUMMARY

In one embodiment, a processor comprises a branch prediction array, an index generator coupled to the branch prediction array, and a control unit coupled to the index generator. The branch prediction array is configured to store a plurality of branch predictions for conditional branches. The index generator is configured to generate an index to the branch prediction array to read at least one of the plurality of branch predictions. The index generator is configured to generate the index responsive to at least a portion of a fetch address corresponding to a fetch request that is at a first pipeline stage of the processor and further responsive to a branch history maintained by the index generator. The control unit is configured to update the branch history responsive to at least a first fetch request at the first pipeline stage, wherein the control unit is configured to defer the update for at least a second fetch request to a second pipeline stage subsequent to the first pipeline stage. Instructions corresponding to the second fetch request are scanned to identify conditional branches at the second pipeline stage. A similar method is contemplated.

In another embodiment, a processor comprises the branch prediction array, the index generator, and a control unit. The control unit is configured to update the active branch history responsive to a first fetch request at the first pipeline stage, and wherein the control unit is configured to restore the active branch history to a state prior to the update for the first fetch request at a second stage of the pipeline at which instruction corresponding to the first fetch request are scanned to identify conditional branches.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
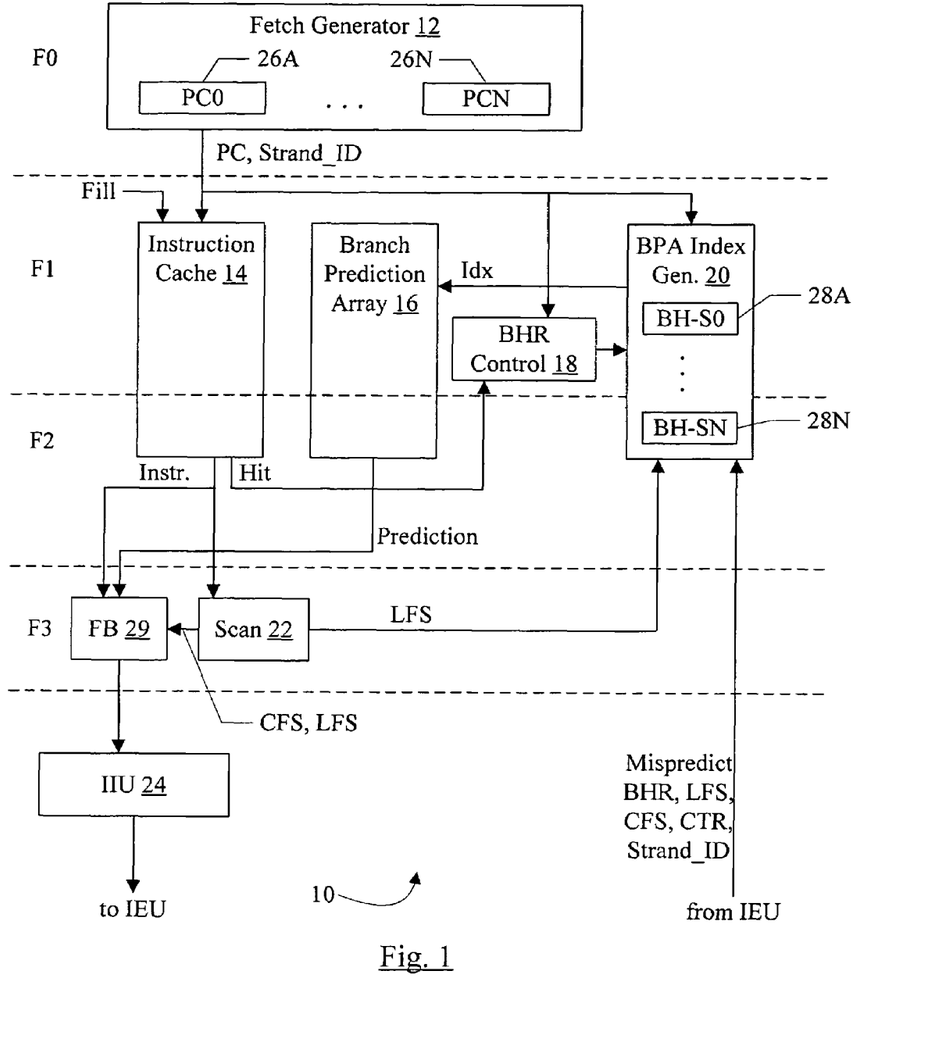
FIG. 1 is a block diagram of one embodiment of a portion of a processor.

Turning now to FIG. 1, a block diagram of one embodiment of a portion of a processor 10 is shown. Particularly, the portion shown may be responsible for fetching and issuing instructions. The embodiment of FIG. 1 includes a fetch generator 12, an instruction cache 14, a branch prediction array 16, a branch history register (BHR) control unit 18, a branch prediction array (BPA) index generator 20, an instruction scan unit 22, an instruction issue unit (IIU) 24, and a fetch buffer (FB) 29. The fetch generator 12 is coupled to provide a fetch address (PC) and a corresponding strand identifier (strand_ID) to the instruction cache 14 and the index generator 20. Additionally, the BHR control unit 18 is coupled to receive the strand_ID. The index generator 20 is configured to transmit an index (Idx) to the branch prediction array 16 to read one or more predictions from the branch prediction array 16. The prediction(s) are provided to the fetch buffer 29. The instruction cache 14 is also coupled to receive a fill (provided by a memory interface to the processor 10, not shown) and is coupled to provide instructions to the scan unit 22 and to the IIU 24. The scan unit 22 is coupled to the fetch buffer 29 to provide a current fetch state (CFS) and a last fetch state (LFS). Additionally, the scan unit 22 is coupled to the index generator 20 to provide the LFS. The fetch buffer 29 is coupled to provide the instructions, the prediction(s), and the corresponding CFS/LFS to the IIU 24. The instruction cache 14 is configured to provide a hit/miss signal (hit) to the BHR control unit 18, which is coupled to the index generator 20. The IIU 24 is coupled to issue instructions to the instruction execution unit (IEU, not shown) and the IEU is configured to provide branch misprediction information and prediction update information to the index generator 20. The misprediction information may include a corrected BHR, LFS, CFS, counter (CTR), and strand_ID. The CTR is actually provided to the branch prediction array 16 for storage. The prediction update information may comprise data to update the branch prediction array 16 (e.g. to further train a prediction) when the branch was correctly predicted.

In the illustrated embodiment, the processor 10 is multithreaded. The processor 10 has hardware resources dedicated to having more than one thread active in the processor at a time. That is, the processor 10 may select any active thread from which to fetch and issue instructions, without software intervention. In one embodiment, the processor 10 may be fine-grain multi-threaded, in which instructions in adjacent pipeline stages may be from different threads. Each thread may include a set of instructions that may execute independently of instructions from another thread. (For example, an individual software process, such as an application, may consist of one or more threads that may be scheduled for execution by an operating system.) The hardware that is provided for a given active thread is referred to as a strand. Some hardware may be shared between strands (e.g. execution unit resources). In the illustrated embodiment, the fetch generator 12 includes a set of program counters (PCs) 26A-26N and the index generator 20 includes a set of branch history registers (BH-S0 to BH-SN) 28A-28N. One PC 26A-26N and one BH-Sx 28A-28N is part of each strand. While a multithreaded embodiment is described herein, single-threaded embodiments may also implement the branch history/branch prediction features described herein.

Also illustrated in FIG. 1, for one embodiment, are pipeline stages at which various portions of the processor 10 may operate (separated by horizontal dashed lines). The illustrated pipeline stages are part of a larger instruction processing pipeline that may be implemented by the processor 10. Other embodiments may implement different pipelines, apportion different units to different stages, and/or may include more or fewer stages than those shown in FIG. 1. In the illustrated embodiment, the pipeline stages are labeled F0 to F3. In some embodiments, one or more pipeline stages may exist between F3 and the IIU 24. A fetch request may be referred to as being at a given pipeline stage if the fetch request has been processed by the preceding pipeline stages and is being processed in the given pipeline stage at a given clock cycle.

In the F0 stage, the fetch generator 12 generates a fetch request. In the F1 stage, the instruction cache 14 access begins and the index generator 20 generates an index for the branch prediction array 16. The BHR control unit 18 may also operate in the F1 stage to generate an update for the corresponding BH-Sx 28A-28N, for some fetch requests. During the F2 stage, the instruction cache 14 access and the branch prediction array 16 access complete. The scan unit 22 operates in the F3 stage along with the fetch buffer 29, and the IIU 24 operates in a subsequent stage to F3. The BHR control unit 18 may also operate in the F3 state to generate an update for the corresponding BH-Sx 28A-28N, for the fetch requests for which updates were not generated in the F1 stage.

The fetch request is provided by the fetch generator 12 to the instruction cache 14 to fetch instructions. The fetch request includes a fetch address (that is, the address at which the fetched instructions are stored, denoted PC). Additionally, in multi-threaded embodiments, a strand_ID is included identifying which strand was selected for fetching. The fetch generator 12 may use any arbitration scheme to select a strand for fetching. In one embodiment, the fetch generator 12 may generate at most two fetch requests for a given strand before at least one of the fetch requests completes. That is, no more than two fetch requests may be outstanding per strand. Other embodiments may permit more than two fetch requests to be outstanding.

The index generator 20 receives the PC and strand_ID, and generates the index for the branch prediction array 16 in response to the PC. The index is an address to the branch prediction array, and identifies one or more entries in the branch prediction array 16 that are to be read in response to the PC. The branch prediction array 16 outputs a prediction or predictions responsive to the index, which is captured by the fetch buffer 29 and provided to the IIU 24 with the corresponding instructions. The scan unit 22 may formulate the CFS for the fetch request, used as discussed in more detail below. Additionally, the branch prediction may be used by the fetch generator 12 for generating subsequent fetches for the strand (connection not shown in FIG. 1).

More particularly, the index generator 20 may use the strand_ID to select a branch history that corresponds to the strand from one of BH-Sx 28A-28N. Generally, a branch history may be any indication of the history of conditional branches (taken/not taken). For example, the branch history may be a bit vector, where each bit in the vector indicates taken (set) or not taken (clear) for a particular recent conditional branch. The least significant bit in the history may correspond to the most recent conditional branch; the second least significant bit may correspond to the second most recent conditional branch; etc. Alternatively, the most significant bit may correspond to the most recent conditional branch, etc. In multi-threaded embodiments, the branch history is the history of branches within the strand.

The index generator 20 may logically combine the PC, or a portion thereof sufficient to address the branch prediction array 16, with the branch history to produce the index. For example, the 14 least significant bits of the PC may be used in one embodiment, and 14 bits of branch history may also be used. Other embodiments may use more or fewer than 14 bits. Any hash function of the PC and the branch history may be defined. For example, a bitwise exclusive OR (XOR) or exclusive NOR (XNOR) of the bits is often used.

The BHR control unit 18 may be responsible for generating updates to the branch history, and particularly may ensure that the branch history is updated in a consistent fashion so that a subsequent fetch request from the same strand uses the same branch history independent of the timing of that subsequent fetch with respect to the previous fetch request. The BHR control unit 18 may generate many updates for fetch requests while the fetch requests are in the F1 stage (that is, the stage at which the index is generated), but may also defer some updates to a later stage at which the instruction corresponding to the fetch address have been scanned (e.g. when the fetch request is at the F3 stage, in one embodiment). In some embodiments, the BHR control unit 18 may update the branch history, but may retain some of the branch history that is replaced in the update. At a subsequent pipeline stage, the BHR control unit 18 may undo the update to the branch history, restoring the active branch history to a state previous to the update using the saved branch history and discarding the newly added history. As used herein, fetch requests may be referred to as being "previous to" (or "subsequent to") other fetch requests. In this context, a first fetch request may be previous to a second fetch request if the first fetch request occurs first in program order (as compared to the second fetch request). Similarly, a first fetch request may be subsequent to a second fetch request if the first fetch request occurs second in program order (as compared to the second fetch request). Fetch requests may also be referred to as older or younger than other fetch requests. An older fetch request may be previous to a younger fetch request.

In one embodiment, the BHR control unit 18 may defer a branch history update if a previous fetch request from the same strand is in flight. Generally, a fetch request may be in flight if the instructions corresponding to the fetch request have not been provided to the issue circuitry. For example, in the illustrated embodiment, a fetch request is in flight if it is in one of the F1, F2, or F3 stages, or has a miss pending awaiting a fill to the instruction cache 14. A miss may remain pending until the fill has completed, updating the instruction cache 14 such that a cache access to the cache line results in a cache hit. Deferring the update may ensure that an update for the previous fetch request (e.g. from the F3 stage) may not conflict with the update for the current fetch request and also may be used to ensure that the updates are performed in order.

In one embodiment, the branch history that is used for a given fetch request does not include the most recent branch history, since updates are often made at the F1 stage before conditional branches have been scanned from the fetched instructions. The branch history used for a given fetch request may be N fetches "old" (that is, excluding the branch history from the N most recent fetch requests), where N is an integer that depends on the number of pipeline stages between the update to the branch history and the determination of the predicted branch behavior for the conditional branches located in the fetched instructions. For example, N may be 2 in one embodiment. Using a branch history that is N fetches old may aid in ensuring that a consistent branch history is used for a given fetch, independent of its timing, because the N-fetch-old branch history may be available for any given timing between fetch requests, in some embodiments.

The scan unit 22 may generate the LFS/CFS information, as mentioned above. The CFS may indicate the number of conditional branches in the fetched instructions, as well as the taken/not taken prediction for each conditional branch. The LFS is similar to the CFS, but corresponds to the previous fetch request from the same thread. The LFS/CFS is passed from the scan unit 22 to the fetch buffer 29, then to the IIU 24, and then to the IEU. The IEU passes the CFS and/or LFS back to the index generator 20 in the case of a training update (or a modified CFS/LFS in the case of a misprediction). Additionally, the LFS is passed to the index generator 20, as previously mentioned. In one embodiment, at most two conditional branches may be detected in the fetched instructions (e.g. if the first conditional branch is not taken or is a short forward branch that has a target address within the group of fetched instructions). Other embodiments may detect only the first conditional branch or more than two conditional branches. A prediction may be supplied by the branch prediction array 16 for each possible conditional branch.

In one embodiment, the IEU may cause updates for two cases: a misprediction, and a training update where a correct prediction occurred. For a training update, the index generator 20 may form an index from the information provided by the IEU and may write the updated prediction to the branch prediction array 16 using the index. Alternatively, the IEU may provide the index and updated prediction data directly to a write port on the branch prediction array 16. In the case of a misprediction, the prediction in the branch prediction array 16 may be updated but the BH-Sx register corresponding to the thread may also be repaired to a value that is consistent with the mispredicted branch instruction. The IEU may provide the data to update the BH-Sx register in such a cache (e.g. strand_ID, CFS and/or LFS, branch history data, etc.).

The instruction cache 14 may check the PC for a hit, and may generate the hit signal to indicate hit (asserted) or miss (deasserted) for the fetch request. If the fetch request is a hit, the instruction cache 14 may also provide the instructions to the scan unit 22. The instruction cache 14 may have any capacity and configuration (e.g. direct mapped, set associative, etc.). The instruction cache 14 may also receive fills returned in response to instruction cache misses (e.g. from a lower level cache such as an L2 cache, or from a memory subsystem).

The scan unit 22 may scan the valid instructions to locate conditional branches to which the prediction from the branch prediction array 16 corresponds. The instruction cache 14 may provide a cache line of instructions, and the valid instructions may exclude those instructions that are prior to the cache line offset of the PC within the cache line. The scan unit 22 may optionally identify other instruction types/attributes, as desired. The scan unit 22 may provide the scan results (e.g. CFS, LFS) to the fetch buffer 29, which may associate the scan results with the corresponding instructions. As mentioned previously, the scan unit 22 may provide the LFS to the index generator 20. Subsequently, the instructions and scan results are provided to the IIU 24. The IIU 24 may decode the instructions and ensure that dependencies are satisfied for each instruction before issuing the instruction to the IEU for execution.

The branch prediction array 16 may be implemented with any capacity and configuration (e.g. set associative, direct mapped, etc.). In one embodiment, the branch prediction array 16 may implement multiple banks. For example, each bank may correspond to a different outcome of the 0, 1, or 2 conditional branches that may be detected for a given fetch request. Any number of entries in the branch prediction array 16 may be implemented. Each entry may store an indication used to produce a branch prediction. For example, saturating counters may be used. The counters may be incremented for a taken branch (saturating at the maximum value of the counter) and decremented for a not taken branch (saturating at zero). A two bit counter may be used, saturating at 11 (binary) for taken and 00 (binary) for not taken. The most significant bit of the counter may be a taken/not taken prediction.

A conditional branch may be an operation executed by the processor 10 that causes instruction fetching to conditionally transfer to a target address or continue sequentially, dependent on a condition specified by the conditional branch. The condition may be a compare operation, or may specify one or more condition code bits in a condition code register. In some embodiments, the conditional branch may be an instruction specified in the instruction set architecture implemented by the processor 10. In other embodiments, the conditional branch may be an internal operation derived from an instruction.

Figure 2:
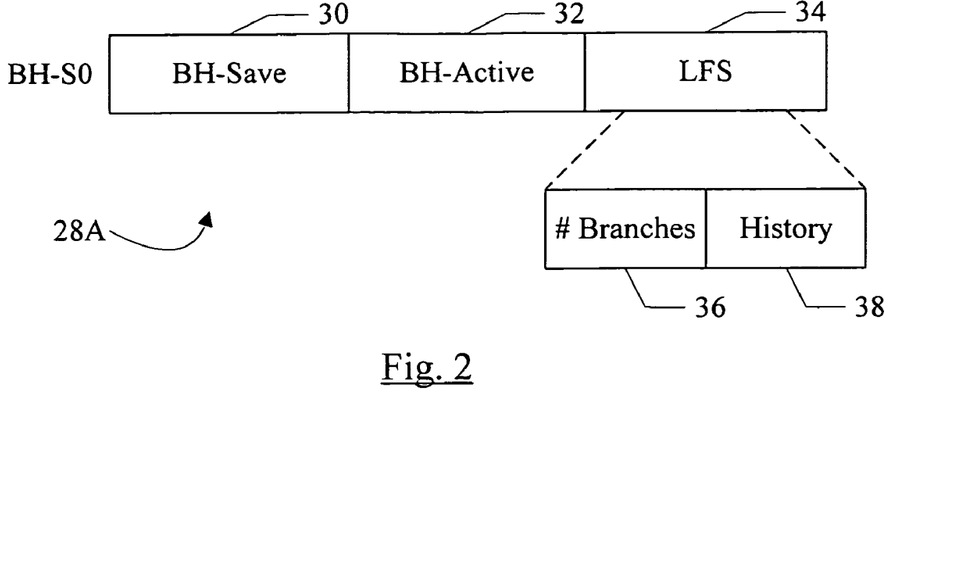
FIG. 2 is a block diagram of one embodiment of a branch history storage shown in FIG. 1.

Turning now to FIG. 2, a block diagram illustrating one embodiment of the BH-S0 register 28A is shown. Other BH-Sx registers 28A-28N may be similar, and correspond to different strands in the processor 10. In the illustrated embodiment, the register 28A includes a BH-Save field 30, a BH-Active field 32, and an LFS field 34.

The BH-Active field 32 stores the active branch history. The active branch history is the branch history that is used, along with the PC, to generate an index to the branch prediction array 16. The active branch history may comprise 14 bits, in one embodiment, although other embodiments may use more or fewer bits.

The BH-Save field 30 may be used to save branch history that is replaced when new branch history is shifted into the active branch history. In one embodiment, the BH-Save field 30 comprises 2 bits (for up to two conditional branches identified in one fetch request). Other embodiments may use more or fewer bits, based on the number of conditional branches per fetch request and the number of fetch requests that may be outstanding per strand.

In one embodiment, branch history updates may comprise a left shift, with the most significant bit or bits of the active branch history (corresponding to the oldest conditional branches represented in the active branch history) being shifted into the BH-Save field 30. New branch history based on the LFS field 34 may be shifted into the least significant bits of the active branch history. Undoing an update (or restoring the previous branch history) may comprise a right shift of the same amount.

An exemplary LFS field 34 is shown in exploded view in FIG. 2 to include a number of branches field 36 and a history field 38. The number of branches field 36 may store the number of conditional branches identified in the fetch state provided from the scan unit 22 (e.g. 0, 1 or 2 for the present embodiment). The number of branches field 36 may serve as a shift count for the branch history update. The history field 38 may store the taken/not taken history for the identified conditional branches. Accordingly, in an embodiment in which up to two conditional branches may be identified, the history field 38 may comprise two bits. The history field 38 may be shifted into the active branch history under control of the shift count.

It is noted that, while a register is described in the present embodiment, the set of BH-Sx registers 28A-28N may be implemented as a memory array (e.g. a random access memory (RAM) array) or as any other clocked storage device (e.g. flop, latch, etc.).

Figure 3:
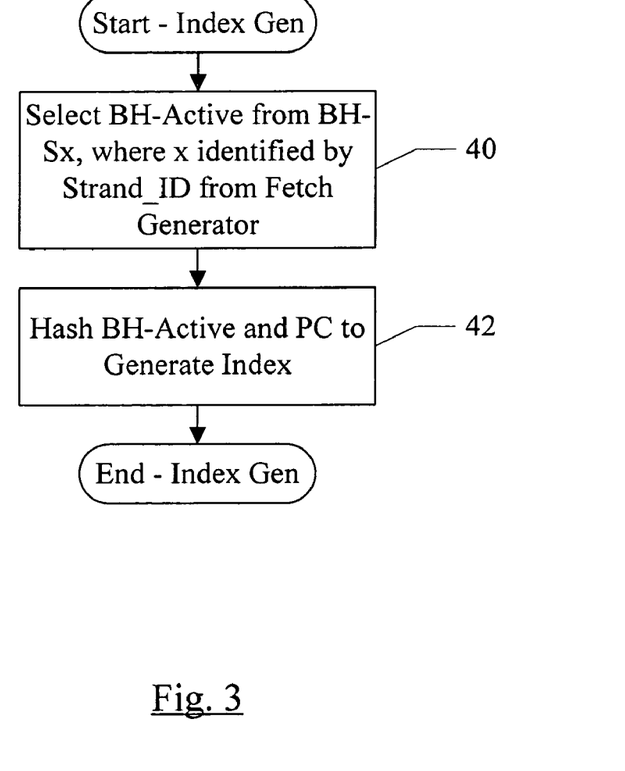
FIG. 3 is a flowchart illustrating operation of one embodiment of index generation in the processor shown in FIG. 1.

Turning now to FIG. 3, a flowchart illustrating operation of one embodiment of the index generator 20 for generating an index to the branch prediction array 16 is shown. While the blocks are shown in a particular order for ease of understanding, other orders may be used. Furthermore, blocks may be performed in parallel by combinatorial logic in the index generator 20. Blocks, combinations of blocks, and/or the flowchart as a whole may be pipelined over multiple clock cycles as well.

The index generator 20 may receive the strand_ID from the fetch generator 12, and may select the BH-Active field 32 from the BH-Sx register 28A-28N identified by the strand_ID (block 40). The index generator 20 may hash the active branch history from the BH-Active field 32 with the PC from the fetch request to generate the index (block 42).

Figure 4:
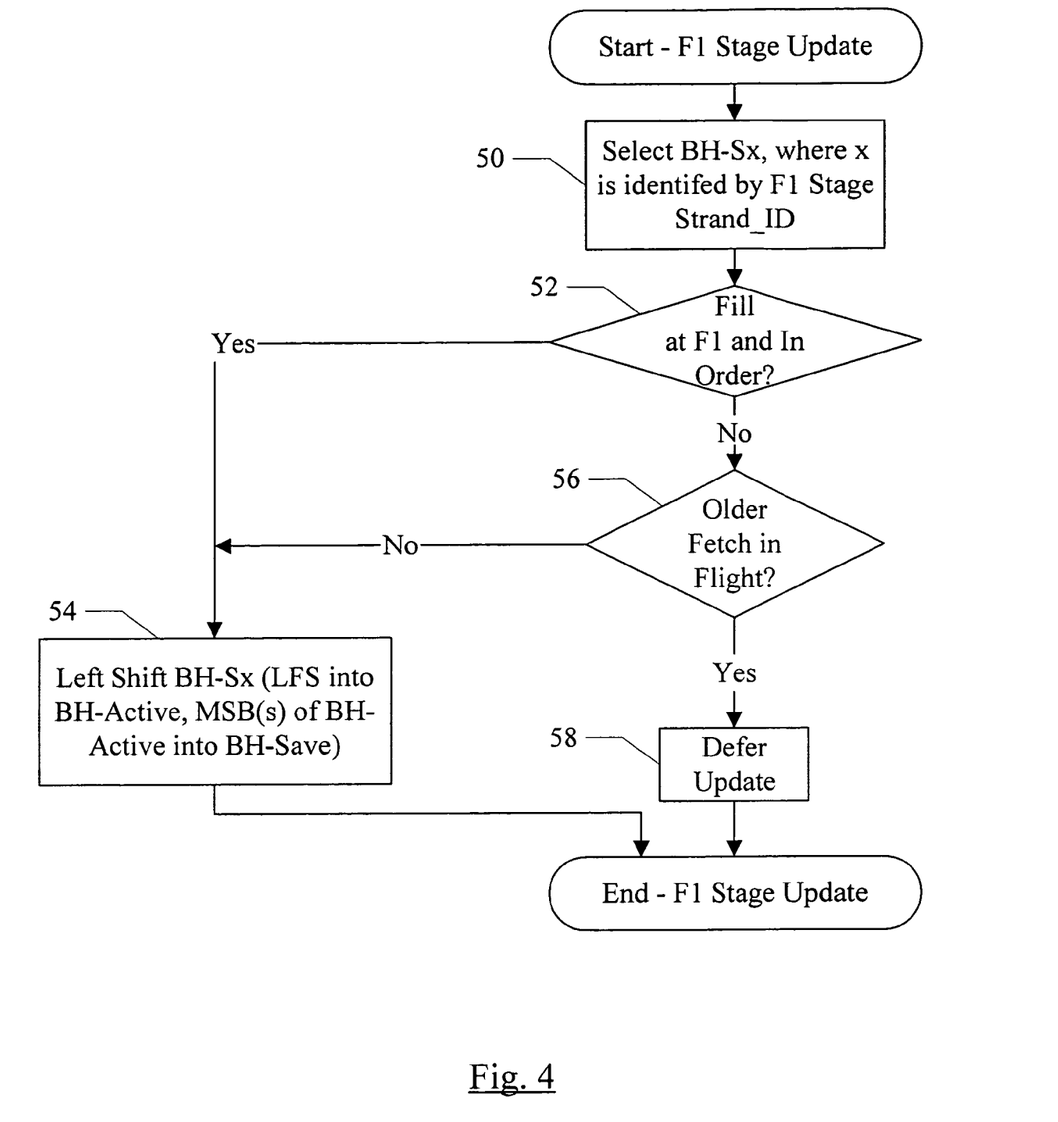
FIG. 4 is a flowchart illustrating operation of one embodiment of a BHR control unit shown in FIG. 1 for at fetch request at an F1 pipeline stage.

Turning now to FIG. 4, a flowchart illustrating operation of one embodiment of the BHR control unit 18 for updating a branch history for a fetch request at the F1 pipeline stage is shown. While the blocks are shown in a particular order for ease of understanding, other orders may be used. Furthermore, blocks may be performed in parallel by combinatorial logic in the BHR control unit 18. Blocks, combinations of blocks, and/or the flowchart as a whole may be pipelined over multiple clock cycles as well.

The BHR control unit 18 may select the BH-Sx register 28A-28N that is identified by the strand_ID of the fetch request at the F1 stage (block 50). If the request at the F1 stage is a fill and the fill is in order for the strand (e.g. an older fetch request is not in flight) (decision block 52, "yes" leg), the BHR control unit 18 may update the active branch history in the selected BH-Sx register 28A-28N. For example, the BHR control unit 18 may left shift the BH-Sx register 28A-28N by the number of bits indicated by the number of branches field 36 in the LFS, shifting the LFS history field 38 into the BH-Active field 32 and shifting the most significant bit or bits of the BH-Active field 32 into the BH-Save field 30 (block 54).

Otherwise (decision block 52, "no" leg), if an older fetch request is not in flight for the same strand (decision block 56, "no" leg), the BHR control unit 18 may also update the active branch history (block 54). If an older fetch request is in flight for the same strand (decision block 56, "yes" leg), the BHR control unit 18 may defer the update to the F3 stage (block 58).

Figure 5:
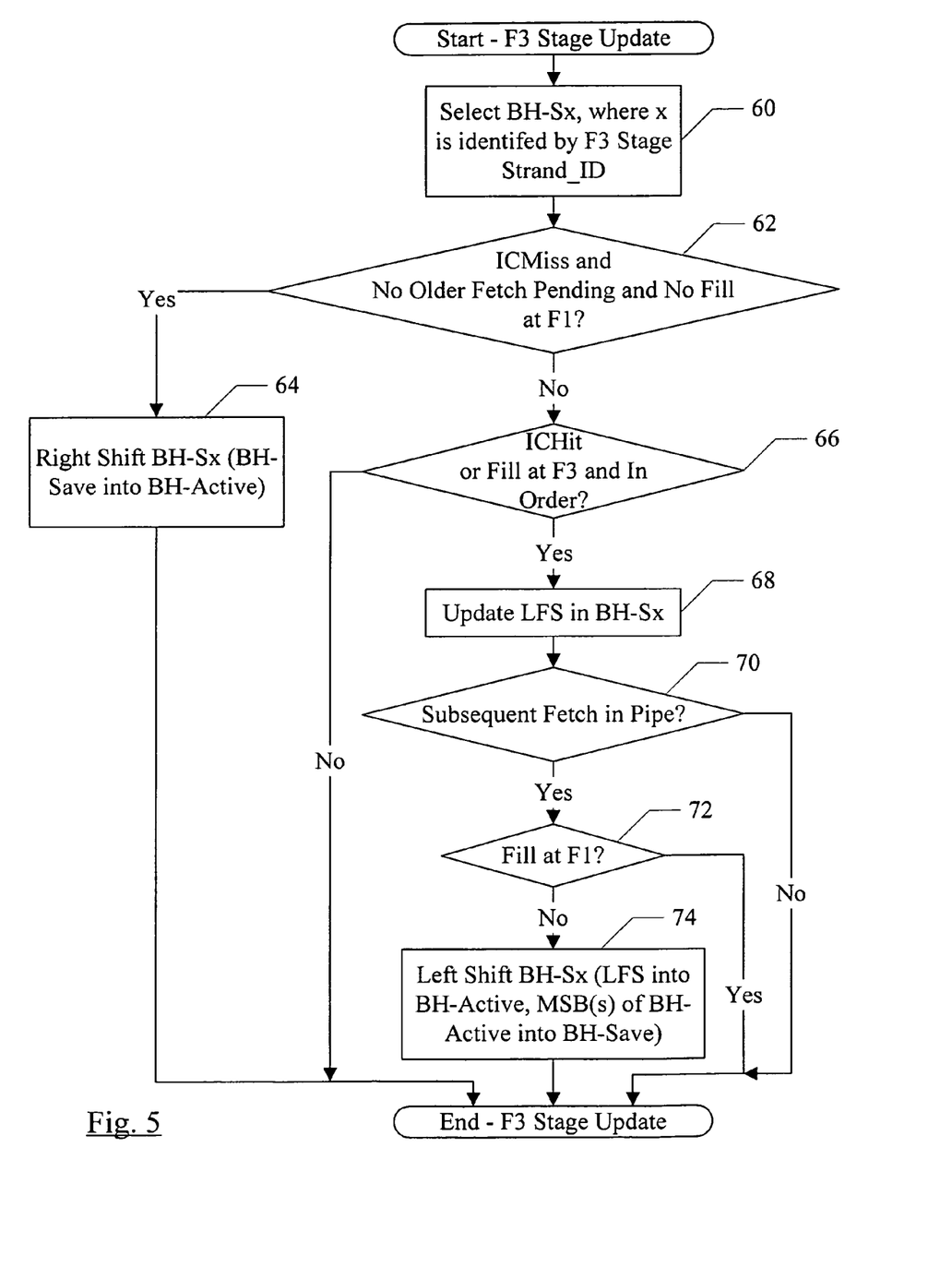
FIG. 5 is a flowchart illustrating operation of one embodiment of a BHR control unit shown in FIG. 1 for at fetch request at an F3 pipeline stage.

Turning now to FIG. 5, a flowchart illustrating operation of one embodiment of the BHR control unit 18 for updating a branch history for a fetch request at the F3 pipeline stage is shown. While the blocks are shown in a particular order for ease of understanding, other orders may be used. Furthermore, blocks may be performed in parallel by combinatorial logic in the BHR control unit 18. Blocks, combinations of blocks, and/or the flowchart as a whole may be pipelined over multiple clock cycles as well.

The BHR control unit 18 may select the BH-Sx register 28A-28N that is identified by the strand_ID of the fetch request at the F3 stage (block 60). If the fetch request is an instruction cache miss, no older fetch request is pending as a cache miss for the same strand, and there is no fill at the F1 stage (decision block 62, "yes" leg), the BHR control unit 18 may undo the update that was previously performed to the BH-Sx register 28A-28N at the F1 stage for this fetch request (decision block 56, "no" leg and block 54). When the fill returns for the cache miss, the update will be made (decision block 52, "yes" leg and block 54). The previous active branch history is restored in the undo. For example, in the present embodiment, the BHR control unit 18 may right shift the selected BP-Sx register 28A-28B, shifting the BH-Save field 30 back into the BH-Active field 32 (block 64).

Otherwise (decision block 62, "no" leg), if the fetch request is an instruction cache miss or a fill and is not in order for fetch requests within the strand (decision block 66, "no" leg), the BHR control unit 18 may not update the BH-Sx register 28A-28N.

Otherwise (decision block 66, "yes" leg), the BHR control unit 18 causes the LFS field 34 in the selected BH-Sx register 28A-28N to update with the LFS from the scan unit 22 (block 68). If a subsequent fetch request is not in the fetch pipeline (e.g. in the F1 or F2 stages, in the present embodiment) (decision block 70, "no" leg), the branch history update was not deferred in this embodiment, and thus no update is needed at the F3 stage. If a subsequent fetch request is in the fetch pipeline (decision block 70, "yes" leg) and there is not a fill at the F1 stage (decision block 72, "no" leg), the BHR update control unit 18 may update the BH-Sx register 28A-28N. For example, the BHR update control unit 18 may left shift the BH-Sx register 28A-28N by the number of bits indicated by the number of branches field 36 in the LFS, shifting the LFS history field 38 into the BH-Active field 32 and shifting the most significant bit or bits of the BH-Active field 32 into the BH-Save field 30 (block 74).

The above discussion generally describes operation of the BHR control unit 18 for fetch requests at the F1 and F3 pipeline stages, respectively. The described operation may also ensure the correct update of the BH-Sx register 28A-28N when there is a collision of two fetch requests from the same strand that are at the F1 and F3 pipeline stages, respectively. For example, a fetch request FetchX and a subsequent fetch request FetchY may be in the F1 and F3 pipeline stages at the same time. Several cases are worth mentioning: (1) the FetchX request in F3 (cache hit) and the FetchY request in F1 at the same time; (2) the FetchY request (cache hit) in F3 and the fill for the FetchX request in F1 at the same time; and (3) the fill for the FetchX request in F3 and the fill for the FetchY request in F1. In case 1, the FetchX request in F3 may cause the update of the BH-Sx register for FetchY (decision block 62, "no" leg since the FetchX request is a hit; decision block 66, "yes" leg because the FetchX request is in order; decision block 70, "yes" leg because the FetchY request is in the fetch pipeline; and decision block 72, "no" leg because the FetchY request is not a fill). In case 2, the update for the FetchY request is prevented and will be made when the FetchY request is later retried, illustrated in FIG. 5 for the FetchY request in F3 (decision block 62, "no" leg because there is a fill at F1; and decision block 66, "no" leg because the FetchY request in F3 is out of order with the FetchX request). In case 3, the LFS updated due to the FetchX fill in F3 (block 68) is bypassed into the update for the BH-Sx shift performed due to the fill for the FetchY request in F1 (block 54).

Turning now to FIGS. 6-9, examples of a pair of fetch requests (FetchX and subsequent fetch request FetchY from the same strand) are shown for different combinations of cache hit/cache miss for each fetch request. The contents of the corresponding BP-Sx register (BH-Save field 30, BH-Active field 32, and LFS field 34) are shown at various points in the processing of the fetch requests. Bits of arbitrary value are illustrated as "$b_{[numerical\ subscript]}$". In the examples, one conditional branch is identified in the LFS field and 4 bits of BH-Active field 32 are shown, for convenience in the example. However, in some embodiments, more than one conditional branch may be identified in the LFS field and thus the left and right shifts may be by the number of bits indicated by the number of conditional branches. In the explanation of each example, reference is made to the decision blocks in the FIGS. 4 and 5 that correspond to each fetch request. The decision blocks referred to are the ones that are matched by the fetch request at that point in the processing. The initial state of the BH-Sx register is the same in each example (BH-Save field 30 having $b_8$ and $b_7$; BH-Active field 32 having $b_6$, $b_5$, $b_4$, and $b_3$; and LFS field 34 having one conditional branch (binary 1) and $b_2$ for the history of the conditional branch).

Figure 6:
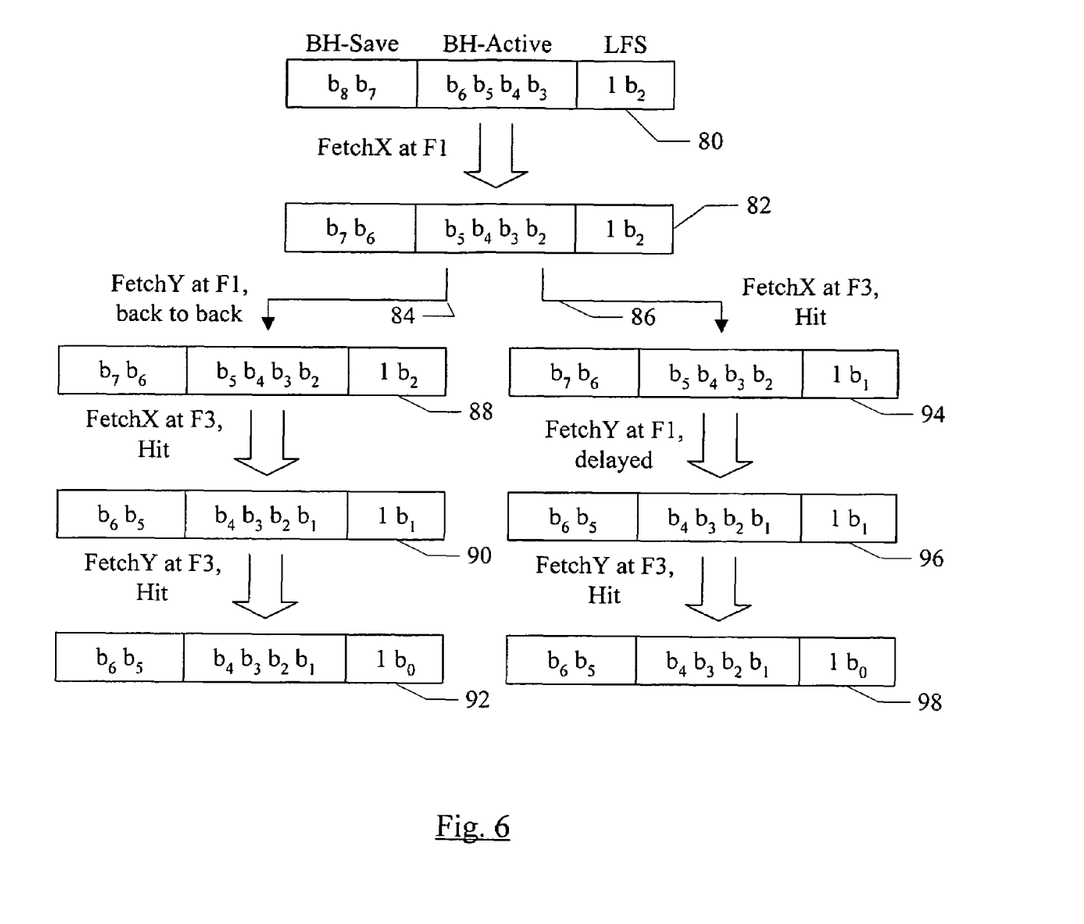
FIG. 6 is an example of two fetch requests that both hit in the instruction cache, for one embodiment of the processor shown in FIG. 1.

FIG. 6 is an example of a cache hit for each fetch request. The initial state of the BH-Sx register is shown at reference numeral 80. The FetchX request arrives at the F1 stage, and causes the BH-Sx register to update, left shifting by one bit as shown at reference numeral 82 (decision block 56, "no" leg). Depending on whether or not the FetchY request is back to back with the Fetch X request, either the FetchY request arrives at the F1 stage first (arrow 84) or the FetchX request arrives at the F3 stage first (arrow 86).

In the back to back case (arrow 84), the FetchY request arrives at the F1 stage. The update for the FetchY request is deferred (decision block 56, "yes" leg). Accordingly, the BH-Sx register is not updated (reference numeral 88). Subsequently, the FetchX request arrives at the F3 stage and is a cache hit. The LFS field is updated (e.g. to another single conditional branch with history $b_1$) and the BH-Sx register is updated with a left shift of the one bit (reference numeral 90). Note that this update is actually the update that corresponds to the FetchY request. When the FetchY request arrives at the F3 stage, no update is made to the branch history (decision block 70, "no" leg) but the LFS is updated (block 68), which is shown at reference numeral 92.

In the case that the FetchY request is delayed from the FetchX request (arrow 86), the FetchX request arrives at the F3 stage prior to the FetchY request arriving at the F1 stage. The FetchX request is a cache hit and is in order with the (yet to be issued) FetchY request, but the FetchY request is not in the fetch pipeline yet. Accordingly (decision block 66, "yes" leg and decision block 70, "no" leg), no update is made to the BH-Sx register except to update the LFS field (reference numeral 94). Subsequently, the FetchY request arrives at the F1 stage. Since the FetchX request is no longer in flight (decision block 56, "no" leg), the BHR control unit 18 updates the BH-Sx register with a left shift of one bit (reference numeral 96). When the FetchY request arrives at the F3 stage and is a cache hit and is in order, but no subsequent fetch is in the fetch pipeline (decision block 66, "yes" leg and decision block 70, "no" leg). Accordingly, no update is made except to update the LFS field (reference numeral 98).

As FIG. 6 illustrates, a consistent active branch history is provided for FetchY in either case ($b_5\ b_4\ b_3\ b_2$, reference numerals 82 and 94). Additionally, a consistent final value of the BH-Sx register is obtained (reference numerals 92 and 98).

Figure 7:
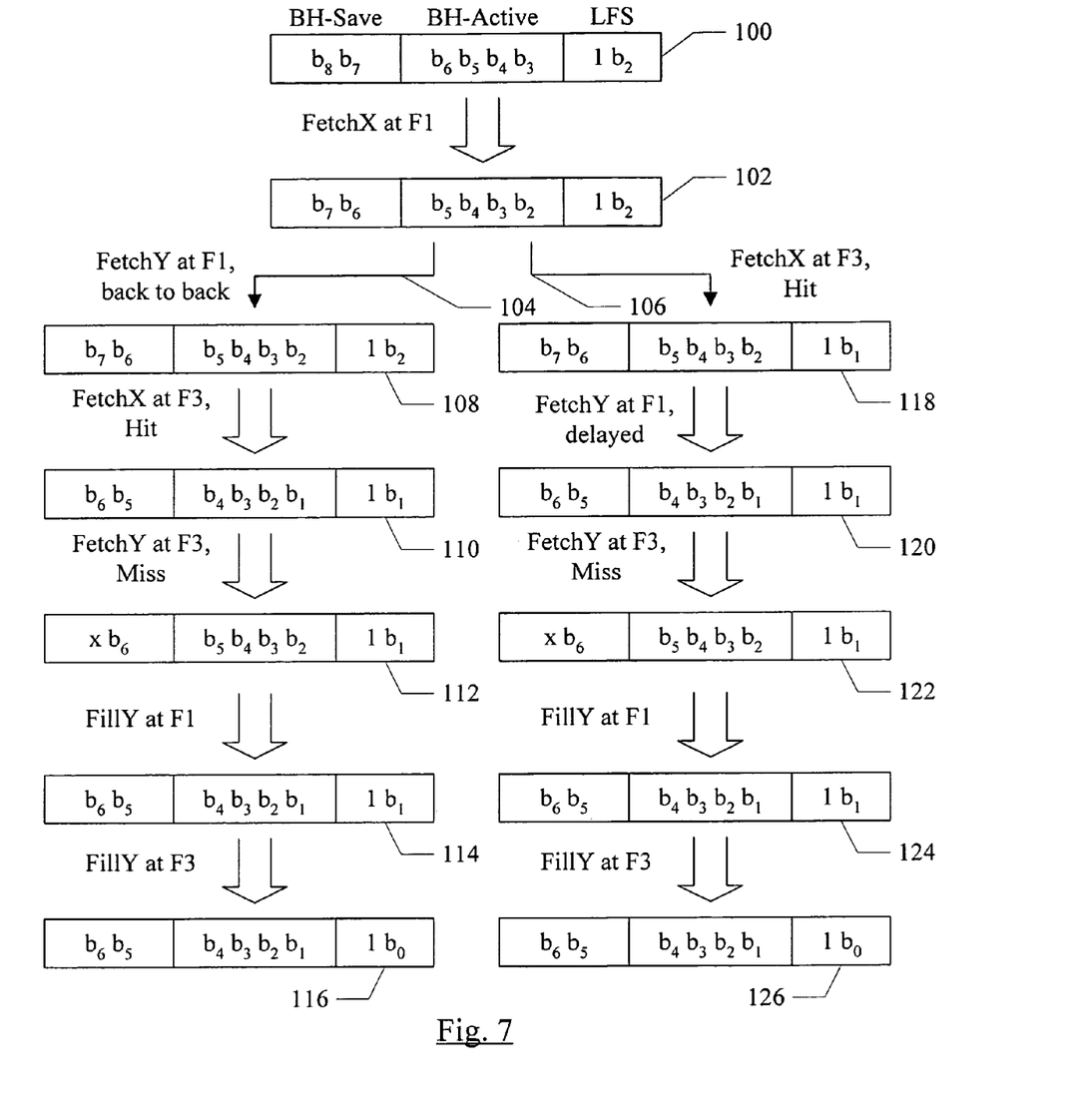
FIG. 7 is an example of two fetch requests, where the first one hits and the second one misses in the instruction cache, for one embodiment of the processor shown in FIG. 1.

Turning next to FIG. 7, an example of FetchX hitting and FetchY missing in the cache is shown. The initial value of the BH-Sx register is shown (reference numeral 100). Similar to FIG. 6, the FetchX request arrives at the F1 stage, and causes the BH-Sx register to update, left shifting by one bit as shown at reference numeral 102 (decision block 56, "no" leg). Depending on whether or not the FetchY request is back to back with the Fetch X request, either the FetchY request arrives at the F1 stage first (arrow 104) or the FetchX request arrives at the F3 stage first (arrow 106).

In the back to back case (arrow 104), the FetchY request arrives at the F1 stage. The update for the FetchY request is deferred (decision block 56, "yes" leg). Accordingly, the BH-Sx register is not updated (reference numeral 108). Subsequently, the FetchX request arrives at the F3 stage and is a cache hit. The LFS field is updated (e.g. to another single conditional branch with history $b_1$) and the BH-Sx register is updated with a left shift of the one bit (reference numeral 110). When the FetchY request arrives at the F3 stage, and is a miss, the previous update is undone (e.g. by a right shift of one bit) (decision block 62, "yes" leg), which is shown at reference numeral 112. Subsequently, the fill for FetchY arrives at the F1 stage, and an update of the BH-Sx register is performed, left shifting by one bit (decision block 52, "yes" leg) (reference numeral 114). When the fill for FetchY arrives at the F3 stage, the LFS field is updated but otherwise no update is made (decision block 66, "yes" leg, block 68, and decision block 70, "no" leg), which is shown at reference numeral 116.

In the case that the FetchY request is delayed from the FetchX request (arrow 106), the FetchX request arrives at the F3 stage prior to the FetchY request arriving at the F1 stage.

The FetchX request is a cache hit and is in order with the (yet to be issued) FetchY request, but the FetchY request is not in the fetch pipeline yet. Accordingly (decision block 66, "yes" leg and decision block 70, "no" leg), no update is made to the BH-Sx register except to update the LFS field (reference numeral 118). Subsequently, the FetchY request arrives at the F1 stage. Since the FetchX request is no longer in flight (decision block 56, "no" leg), the BHR control unit 18 updates the BH-Sx register (reference numeral 120) with a left shift of one bit. When the FetchY request arrives at the F3 stage and is a miss, the previous update is undone (e.g. by a right shift of one bit) (decision block 62, "yes" leg), which is shown at reference numeral 122. Subsequently, the fill for FetchY arrives at the F1 stage, and an update of the BH-Sx register is performed, left shifting by one bit (decision block 52, "yes" leg) (reference numeral 124). When the fill for FetchY arrives at the F3 stage, the LFS field is updated but otherwise no update is made (decision block 66, "yes" leg, block 68, and decision block 70, "no" leg), which is shown at reference numeral 126.

FIG. 7 illustrates that a consistent active branch history is provided for FetchY in each case ($b_5$ $b_4$ $b_3$ $b_2$, reference numerals 102, 112, 118 and 122). Additionally, a consistent final value of the BH-Sx register is obtained (reference numerals 116 and 126).

Figure 8:
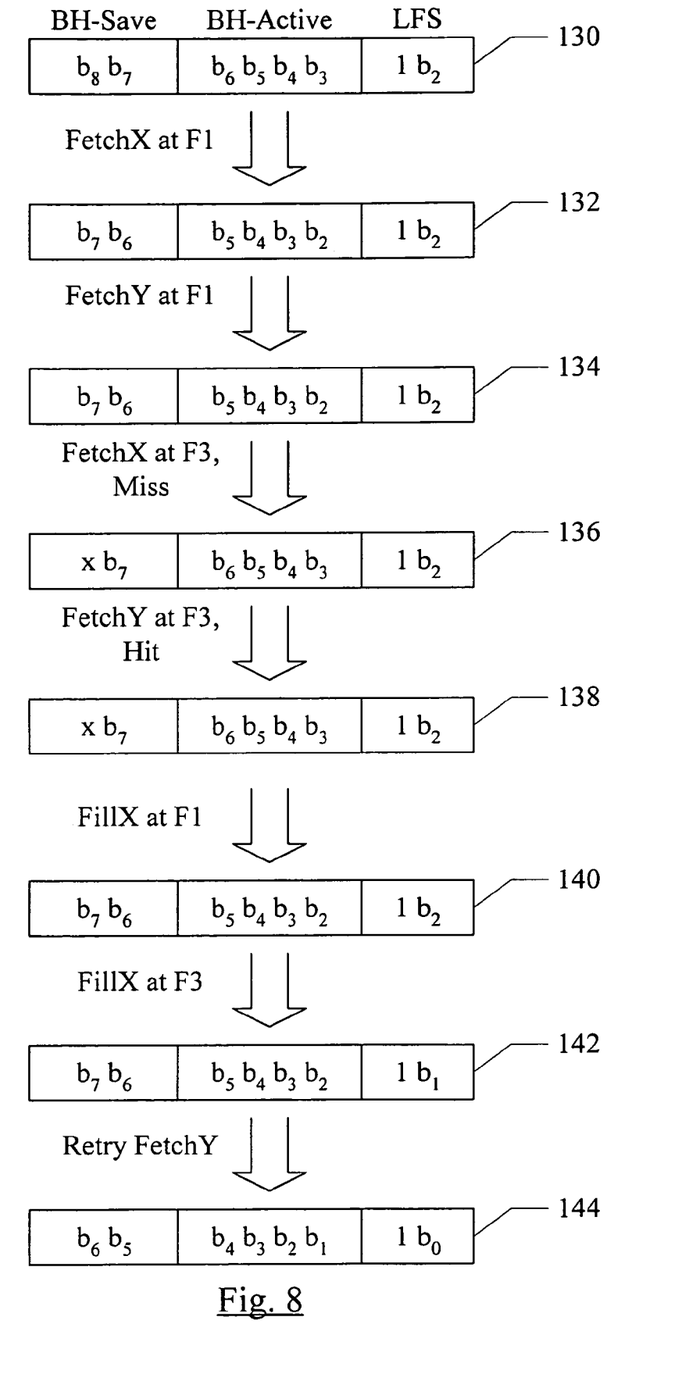
FIG. 8 is an example of two fetch requests, where the first one misses and the second one hits in the instruction cache, for one embodiment of the processor shown in FIG. 1.

FIG. 8 is an example of FetchX missing and FetchY hitting in the cache. The initial value of the BH-Sx register is shown (reference numeral 130). Similar to FIG. 6, the FetchX request arrives at the F1 stage, and causes the BH-Sx register to update, left shifting by one bit as shown at reference numeral 132 (decision block 56, "no" leg). The back to back case is shown in FIG. 8. If the FetchY request is delayed, the same set of events happens (unless the FetchY request is delayed until the FetchX request is completed, which is the same as the FetchX request case) so it is not necessary to show both cases. The FetchY request arrives at the F1 stage. The update for the FetchY request is deferred (decision block 56, "yes" leg). Accordingly, the BH-Sx register is not updated (reference numeral 134). Subsequently, the FetchX request arrives at the F3 stage and is a cache miss. Accordingly, the previous update is undone (e.g. by a right shift of one bit) (decision block 62, "yes" leg), which is shown at reference numeral 136. Subsequently, the FetchY request arrives at the F3 stage, and is a cache hit. Since the FetchX request is still pending as a cache miss, the FetchY request is out of order. Accordingly, no update is made (decision block 66, "no" leg), shown at reference numeral 138. The fill for FetchX arrives at the F1 stage, and so the BH-Sx is updated (left shift by one bit) according to decision block 52, "yes" leg (reference numeral 140). When the fill for FetchX arrives at the F3 stage, the LFS field is updated but no other update is made (decision block 66, "yes" leg, block 68, and decision block 70, no leg), shown at reference numeral 142. Subsequently, FetchY is retried (since it was out of order on the previous attempt). The BH-Sx is updated as shown at reference numeral 144.

Figure 9:
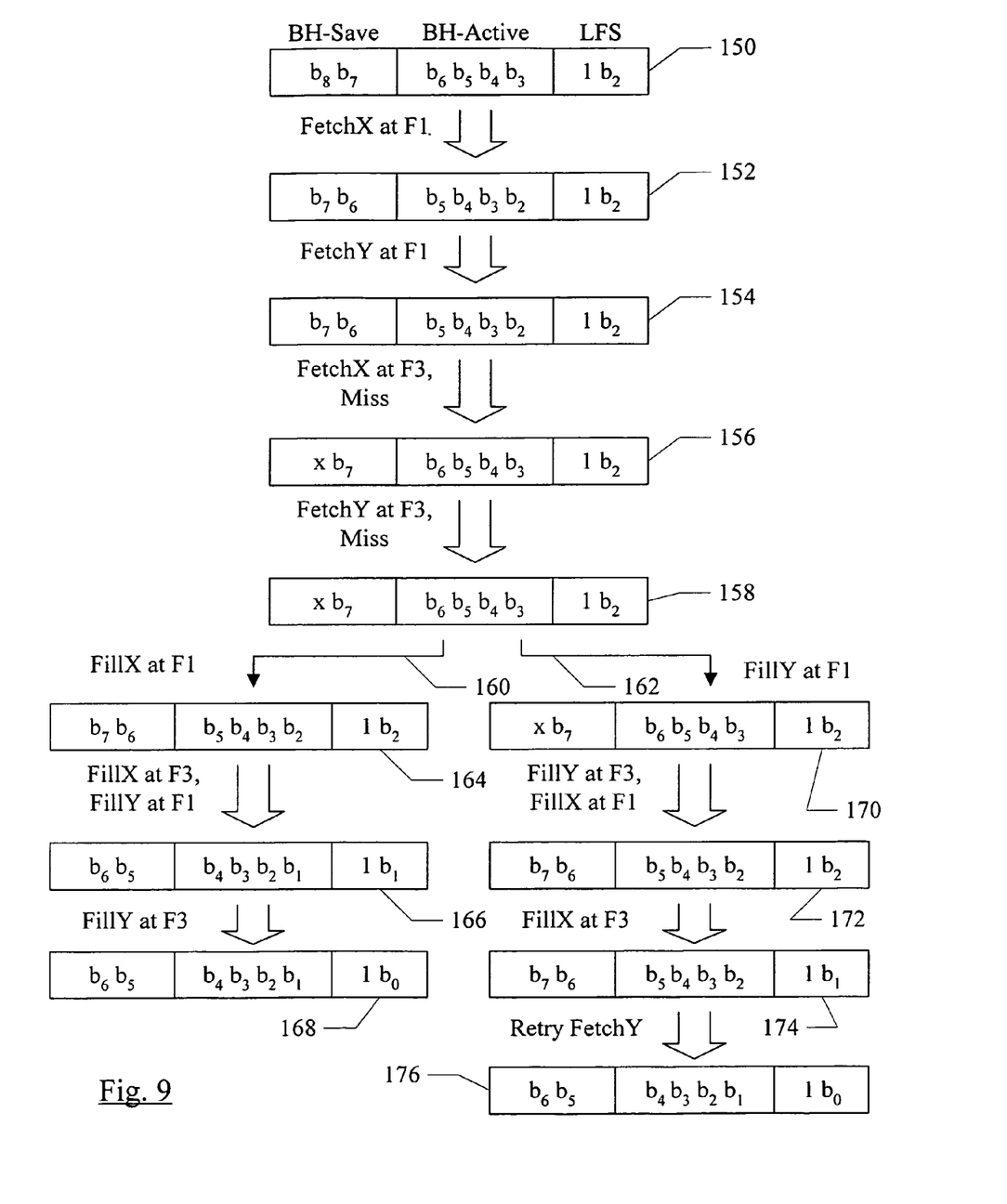
FIG. 9 is an example of two fetch requests that both miss in the instruction cache, for one embodiment of the processor shown in FIG. 1.

FIG. 9 an example of FetchX missing and FetchY missing in the cache. The initial value of the BH-Sx register is shown (reference numeral 150). Similar to FIG. 6, the FetchX request arrives at the F1 stage, and causes the BH-Sx register to update, left shifting by one bit as shown at reference numeral 152 (decision block 56, "no" leg). The back to back case is shown in FIG. 9. If the FetchY request is delayed, the same set of events happens (unless the FetchY request is delayed until the FetchX request is completed, which is the same as the FetchX request case) so it is not necessary to show both cases. The FetchY request arrives at the F1 stage. The update for the FetchY request is deferred (decision block 56, "yes" leg). Accordingly, the BH-Sx register is not updated (reference numeral 154). Subsequently, the FetchX request arrives at the F3 stage and is a cache miss. Accordingly, the previous update is undone (e.g. by a right shift of one bit) (decision block 62, "yes" leg), which is shown at reference numeral 156. Subsequently, the FetchY request arrives at the F3 stage, and is a cache miss also. Since the FetchX request is still pending as a cache miss and the FetchY request is a miss, no update for the FetchY request is made (decision block 62, "no" leg and decision block 66, "no" leg) shown at reference numeral 158. The fills may arrive in either order in this embodiment. The fill for FetchX arriving first is shown through arrow 160, and the fill for FetchY arriving first is shown through arrow 162.

Following arrow 160 for the fill for FetchX arriving first, the fill for FetchX arrives at the F1 stage, and so the BH-Sx is updated (left shift by one bit) according to decision block 52, "yes" leg (reference numeral 164). When the fill for FetchX arrives at the F3 stage, the LFS field is updated but no other update is made (decision block 66, "yes" leg, block 68, and decision block 70, no leg), shown at reference numeral 166. Additionally, when the fill for FetchY arrives at the F1 stage, the BH-Sx register is updated (left shift by one bit according to the new LFS field), according to decision block 52, "yes" leg (also shown at reference numeral 166). The same operation may occur if the fill for FetchY arrives at the F1 stage at the same time as the fill for FetchX arrives at the F3 stage, or later. The fill for FetchY subsequently arrives at the F3 stage, and the LFS field is updated but no other update is made (decision block 62, "no" leg, decision block 66, "yes" leg, block 68, and decision block 70, "no" leg) (reference numeral 168).

Following arrow 162 for the fill for FetchY arriving first, the fill for FetchY arrives at the F1 stage. The fill is out of order (with the FetchX request) and there is an older fetch in flight (the FetchX request), so the update is deferred (decision block 52, "no" leg and decision block 56, "yes" leg, reference numeral 170. When the fill for FetchX arrives at the F1 stage, the BH-Sx register is updated with a 1 bit left shift according to the LFS field (decision block 52, "yes" leg), shown at reference numeral 172. Additionally, when the fill for FetchY arrives at the F3 stage, which causes no update since it is out of order (decision block 62, "no" leg and decision block 66, "no" leg). The fill for FetchX subsequently arrives at the F3 stage, and the LFS field is updated but no other update is made (decision block 62, "no", leg, decision block 66, "yes" leg, block 68, and decision block 70, "no" leg) (reference numeral 174). Subsequently, FetchY is retried (since it was out of order on the previous attempt). The BH-Sx is updated as shown at reference numeral 176.

As FIG. 9 illustrates, a consistent active branch history is provided for FetchY in each case ($b_5$ $b_4$ $b_3$ $b_2$, reference numerals 152, 164, and 174). The fill at reference numeral 170 is out of order, so that result is discarded. Additionally, a consistent final value of the BH-Sx register is obtained (reference numerals 168 and 176). Particularly, a consistent final value of the BH-Sx register is obtained in each example (reference numerals 92 and 98 in FIG. 6, reference numerals 116 and 126 in FIG. 7, reference numeral 144 in FIG. 8, and reference numerals 168 and 176 in FIG. 9).

Numerous variations and modifications will become apparent to those skilled in the art once the above disclosure is fully appreciated. It is intended that the following claims be interpreted to embrace all such variations and modifications.

What is claimed is:

1. A processor comprising:
a branch prediction array configured to store a plurality of branch predictions for conditional branches;
an index generator coupled to the branch prediction array, wherein the index generator is configured to generate an index to the branch prediction array to read at least one of the plurality of branch predictions, wherein generating the index comprises logically combining at least: (i) at least a portion of a fetch address corresponding to a fetch request that is at a first pipeline stage of the processor; and (ii) a branch history maintained by the index generator; and a control unit coupled to the index generator, wherein the control unit is configured to update the branch history maintained by the index generator responsive to at least a first fetch request at the first pipeline stage, and wherein the control unit is configured to defer an update for at least a second fetch request to a second pipeline stage subsequent to the first pipeline stage, wherein instructions corresponding to the second fetch request are scanned to identify conditional branches at the second pipeline stage.

2. The processor as recited in claim 1 wherein the second fetch request is subsequent to the first fetch request and the first fetch request is in flight when the second fetch request is at the first stage.

3. The processor as recited in claim 2 wherein the processor is multi-threaded, and wherein the first fetch request and the second fetch request correspond to the same strand of a plurality of strands implemented by the processor.

4. The processor as recited in claim 3 wherein the index generator is configured to maintain a separate branch history for each strand of the plurality of strands.

5. The processor as recited in claim 1 wherein the index generator is configured to retain branch history that would be replaced in an update as a retained branch history.

6. The processor as recited in claim 5 wherein the index generator is configured to receive a current fetch state that identifies branch history for conditional branches corresponding to a fetch request, wherein the index generator is configured to store the current fetch state as a last fetch state.

7. The processor as recited in claim 6 wherein the update comprises updating the branch history with the last fetch state.

8. The processor as recited in claim 7 wherein the update comprises shifting the last fetch state into the branch history, and wherein the retained branch history comprises the history that is shifted out of the branch history in the shift.

9. A method comprising:
generating an index to a branch prediction array in a processor, wherein the branch prediction array stores a plurality of branch predictions for conditional branches, the generating comprising logically combining at least: (i) at least a portion of a fetch address corresponding to a fetch request that is at a first pipeline stage of the processor; and (ii) a branch history;
updating the branch history responsive to at least a first fetch request at the first pipeline stage; and
deferring an update for at least a second fetch request to a second pipeline stage subsequent to the first pipeline stage, wherein instructions corresponding to the second fetch request are scanned to identify conditional branches at the second pipeline stage.

10. The method as recited in claim 9 wherein the second fetch request is subsequent to the first fetch request and the first fetch request is in flight when the second fetch request is at the first stage.

11. The method as recited in claim 10 wherein the processor is multi-threaded, and wherein the first fetch request and the second fetch request correspond to the same strand of a plurality of strands implemented by the processor, and the method further comprising maintaining a separate branch history for each strand of the plurality of strands.

12. The method as recited in claim 9 further comprising retaining branch history that would be replaced in an update as a retained branch history.

13. The method as recited in claim 12 further comprising:
receiving a current fetch state that identifies branch history for conditional branches corresponding to a fetch request; and
storing the current fetch state as a last fetch state; and
wherein updating the branch history comprises updating the branch history with the last fetch state.

14. The method as recited in claim 13 wherein the updating comprises shifting the last fetch state into the branch history, and wherein the retained branch history comprises the history that is shifted out of the branch history in the shift.

15. A processor comprising:
a branch prediction array configured to store a plurality of branch predictions for conditional branches;
an index generator coupled to the branch prediction array, wherein the index generator is configured to generate an index to the branch prediction array to read at least one of the plurality of branch predictions, wherein generating the index comprises logically combining at least: (i) at least a portion of a fetch address corresponding to a fetch request that is at a first pipeline stage of the processor; and (ii) an active branch history maintained by the index generator; and
a control unit coupled to the index generator, wherein the control unit is configured to update the active branch history maintained by the index generator responsive to a first fetch request at the first pipeline stage, and wherein the control unit is configured to restore the active branch history maintained by the index generator to a state prior to the update for the first fetch request at a second stage of the pipeline at which instruction corresponding to the first fetch request are scanned to identify conditional branches.

16. The processor as recited in claim 15 wherein the control unit is configured to undo the update responsive to the first fetch request missing in an instruction cache of the processor and an older fetch request is not pending as a cache miss.

17. The processor as recited in claim 16 wherein the processor is multi-threaded, and wherein the first fetch request and the older fetch request correspond to the same strand of a plurality of strands implemented by the processor.

18. The processor as recited in claim 15 wherein a branch history maintained by the index generator comprises the active branch history used to generate the index and a saved branch history used to restore the active branch history.

19. The processor as recited in claim 18 wherein an update to the branch history comprises shifting the history update into the active branch history and shifting out an oldest portion of the active branch history to the saved branch history.

20. The processor as recited in claim 19 wherein the control unit restoring the active branch history comprises the control unit shifting the saved branch history back into the active branch history.

* * * * *